United States Patent
Lauri et al.

(10) Patent No.: US 9,394,417 B2
(45) Date of Patent: Jul. 19, 2016

(54) PROCESS FOR THE PRODUCTION OF PET FOAMS AND PET FOAMS OBTAINED WITH SAID PROCESS

(71) Applicant: DIAB INTERNATIONAL AB, Laholm (SE)

(72) Inventors: Leone Lauri, Conegliano-Treviso (IT); Raffaela Bressan, Oderzo-Treviso (IT); Luigi Aliperta, Rivamonte Agordino-Belluno (IT); Eva-Lotta Magdalena Petersson, Båstad (SE)

(73) Assignee: DIAB INTERNATIONAL AB, Laholm (SE)

( * ) Notice: Subject to any disclaimer, the term of this patent is extended or adjusted under 35 U.S.C. 154(b) by 0 days.

(21) Appl. No.: 14/371,146

(22) PCT Filed: Jan. 14, 2013

(86) PCT No.: PCT/EP2013/000079
§ 371 (c)(1),
(2) Date: Jul. 8, 2014

(87) PCT Pub. No.: WO2013/113465
PCT Pub. Date: Aug. 8, 2013

(65) Prior Publication Data
US 2014/0357744 A1 Dec. 4, 2014

(30) Foreign Application Priority Data

Feb. 2, 2012 (IT) .............. MI2012A0135

(51) Int. Cl.
| | |
|---|---|
| C08J 9/00 | (2006.01) |
| C08J 9/14 | (2006.01) |
| B29C 44/34 | (2006.01) |
| C08L 67/02 | (2006.01) |
| C08G 59/68 | (2006.01) |
| C08L 63/00 | (2006.01) |
| B29C 44/50 | (2006.01) |
| B29K 63/00 | (2006.01) |
| B29K 67/00 | (2006.01) |
| B29K 75/00 | (2006.01) |
| B29K 105/04 | (2006.01) |

(52) U.S. Cl.
CPC ........... *C08J 9/0061* (2013.01); *B29C 44/3446* (2013.01); *B29C 44/50* (2013.01); *C08G 59/686* (2013.01); *C08J 9/0066* (2013.01); *C08J 9/141* (2013.01); *C08L 63/00* (2013.01); *C08L 67/02* (2013.01); *B29K 2063/00* (2013.01); *B29K 2067/003* (2013.01); *B29K 2075/00* (2013.01); *B29K 2105/04* (2013.01); *B29K 2995/0015* (2013.01); *B29K 2995/0063* (2013.01); *C08J 2363/00* (2013.01); *C08J 2367/02* (2013.01); *C08J 2463/00* (2013.01)

(58) Field of Classification Search
CPC ...... C08J 9/0061; C08J 9/141; C08J 2367/02; C08J 2463/00; C08J 9/0066; C08L 67/02; C08L 63/00; B29C 44/3446; B29C 44/50; C08G 59/686; B29K 2063/00; B29K 2067/003; B29K 2075/00
USPC .................. 521/129, 114, 131, 182
See application file for complete search history.

(56) References Cited

U.S. PATENT DOCUMENTS

| | | | | |
|---|---|---|---|---|
| 5,807,959 A | * | 9/1998 | Wu et al. ........................ | 528/101 |
| 6,323,251 B1 | | 11/2001 | Perez | |
| 7,193,016 B1 | * | 3/2007 | Woods et al. ................. | 525/113 |
| 7,646,088 B2 | * | 1/2010 | Itoh et al. ...................... | 257/687 |
| 2008/0287574 A1 | * | 11/2008 | Loth et al. ....................... | 524/35 |

* cited by examiner

*Primary Examiner* — Irina S Zemel
(74) *Attorney, Agent, or Firm* — Themis Law

(57) ABSTRACT

A process for the production of PET foams includes the extrusion of a mixture of PET, epoxy resin, catalyst consisting of imidazole, derivatives of imidazole or mixtures thereof plus a blowing agent, wherein the homopolymerization reaction of the epoxy phase is performed in the extruder, upstream of the introduction of the blowing agent. Compared to the methods of the known art, a process according to the invention offers the advantage of providing a stable PET foam, in which the structure of the polymer chains is kept unaltered. The system therefore has viscoelasticity characteristics which allow the PET/epoxy homopolymer to receive the expanding action of the blowing agent, as far as the innermost and deepest layers of foam also even if they have a significant thickness.

8 Claims, 5 Drawing Sheets

PROCESS FOR THE PRODUCTION OF PET FOAMS AND PET FOAMS OBTAINED WITH SAID PROCESS

FIELD OF THE INVENTION

The invention relates to an enhanced process for the production of PET foams.

The invention also relates to PET foams obtained with this process and to the bodies of expanded material obtained from these foams.

The field of the invention is the production of PET (polyethylene terephthalate) foams, normally used in the production of panels with numerous types of processing to make them suitable as a "core material" for various types of sandwich structures and also for thermal insulation.

BACKGROUND OF THE INVENTION

Extending PET chains with pyromellitic anhydride and other crosslinking agents is known, for giving PET the necessary consistency for receiving the blowing agent, thus obtaining an expanded and stable foam. As a result, during the following extrusion phases of the foam, more or less significant phenomena of polymer degradation may arise, which in any case represent problems with respect to the quality of the final product.

Preparing a thermoplastic polymer foam in the presence of epoxides, crosslinked by means of photosensitive catalysts is also known (U.S. Pat. No. 6,323,251), wherein the crosslinking reaction of the epoxide is effected downstream of the injection of the blowing agent, in particular outside the extrusion. The known process is consequently not suitable for providing a foam having the necessary consistency for the formation of the final product. In addition, photosensitive catalysts only act on the surface layer of the foam, which does not allow the crosslinking reaction to also take place inside the foamy mass.

SUMMARY OF THE INVENTION

The main objective of the present invention is to provide a method suitable for obtaining a PET foam which, unlike the known methods, has characteristics of stability at the outlet of the extruder, without altering, however, the structure of the PET chains.

These and other objectives are achieved by the present process, the PET foam and expanded material as described and claimed hereinafter. Preferred embodiments of the invention are particularly described and claimed.

Compared to the methods of the known art, the invention offers the advantage of providing a stable PET foam, in which the structure of the polymer chains is kept unchanged. The system also has viscoelasticity characteristics which allow the mixture of PET/epoxy homopolymer to receive the expanding action of the blowing agent, as far as the innermost and deepest layers of foam which may have a significant thickness.

BRIEF DESCRIPTION OF THE DRAWINGS

These and other objectives, advantages and characteristics appear evident from the following description of a preferred embodiment of the invention illustrated, as a non-limiting example, in the figures of the enclosed drawings.

In these.

DETAILED DESCRIPTION OF EMBODIMENTS OF THE INVENTION

Figure 1:
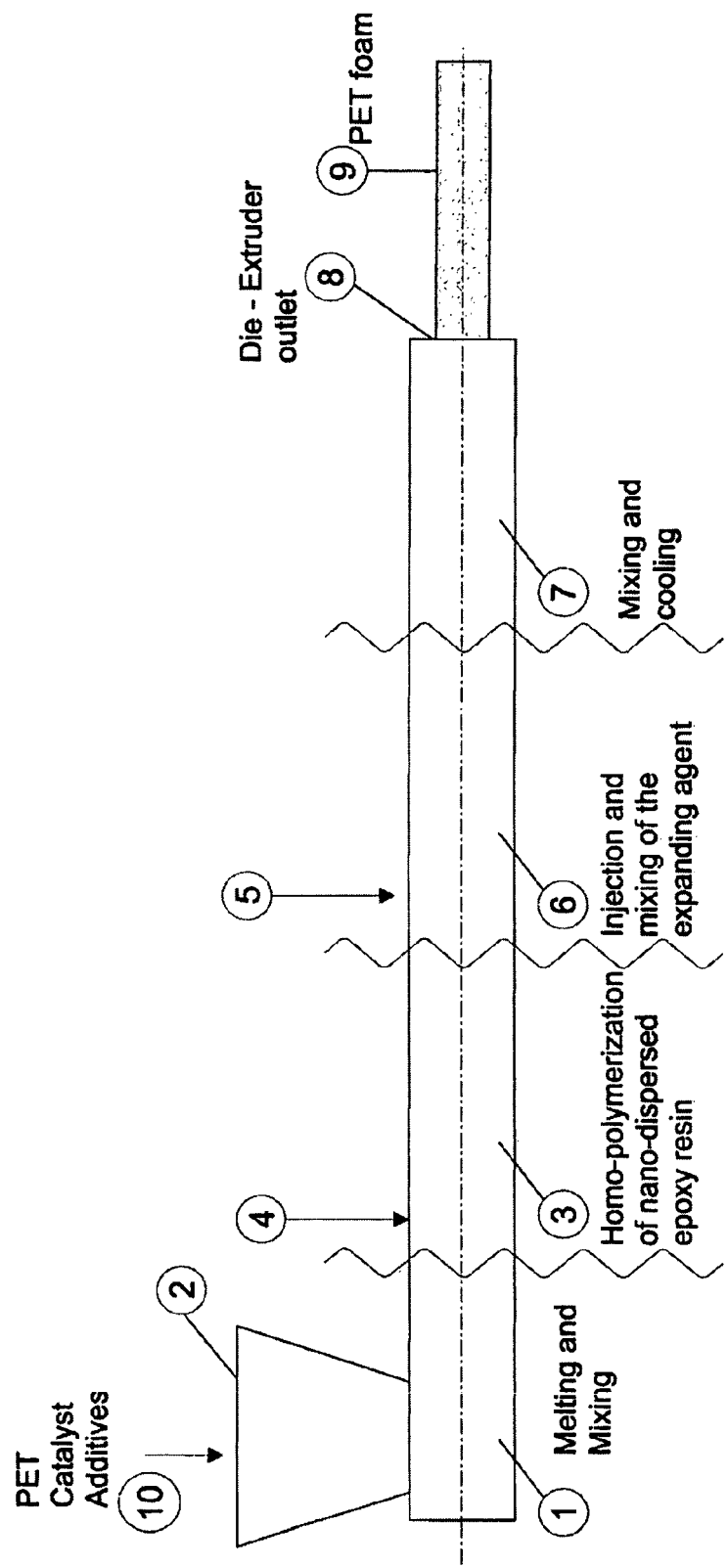
FIG. 1 illustrates a scheme of the extruder used for effecting the process of the invention.

The extruder, as schematically represented in FIG. 1 and used for performing a process according to the invention, is substantially divided into a step 1 for melting and mixing the PET mass 10, catalyst and other possible additives fed through the hopper 2, a reactive extrusion step 3 (homopolymerization of the epoxy phase) an injection step 6 of the blowing agent and a cooling step 7.

The PET used is in particular a PET suitable for being processed by extrusion, having the following chemical formula (I):

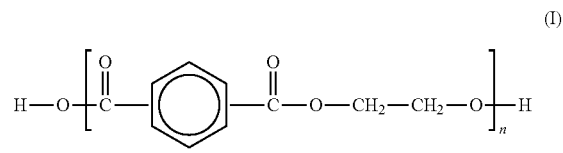

(I)

The catalyst is then added to the PET, which, according to the invention, consists of imidazole, derivatives of imidazole and mixtures thereof, represented by the following formula (II):

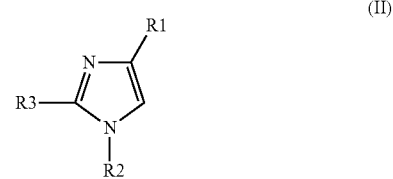

(II)

wherein R1, R2, R3 are inorganic or organic groups the aromatic or aliphatic type.

Some non-limiting examples of catalysts used in the process of the invention 2-methylimidazole, 2-ethyl-4-methylimidazole, 1-Benzyl-2-methylimidazole, 1-methylimidazole, 1,2-dimethylimidazole and mixtures thereof.

Among the additives that can be used in the process of the invention, suitable for improving the processability, appearance, and properties of the PET foam, the following can be mentioned, alone or combined with each other:

plasticizers
pigments
flame-retardants
fillers
stabilizers
surfactants nucleating agents nano-additives The catalyst used in the invention is in liquid phase and, in step 1 of the extruder, it is closely mixed inside the PET mass. The mixture thus obtained is then sent, from the screw of the extruder (not represented), towards a subsequent step 3 for putting the PET mass in contact with the catalyst and mixing them with an injection 4 of epoxy resin, also in liquid state.

Preferred epoxy resins for the invention are those having the following formula (III)

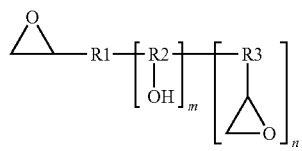

(III)

wherein:

m and n are integers (0, 1, 2, 3, . . . )

R1, R2 and R3 represent an aliphatic or aromatic group, or an inorganic chain.

Among the epoxy resins that can be used in the process of the invention, the following can be cited:

epoxidized novolacquers from phenol or cresol (polyphenyl-glycidyl ether-co-formaldehyde, poly-o-cresyl-glycidyl ether-co-formaldehyde);

mono- or poly-glycidyl ether or ester, aliphatic or aromatic (polibisphenol A-co-epichlorohydrin-glycidyl terminated; 2-ethylhexyl glycidyl ether; 1-4-butanediol of glycidyl ether; tertaglycidyl-methylbisbenzeneamine; butylphenyl-glycidyl ether), organic or inorganic epoxidized chains (glycidoxypropyl-trimethoxysilane; glycidoxypropyltriethoxysilane butyldimethylsilane-glycidyl ether; bis-glycidyloxypropyltetra-methyldisiloxane);

polyhedral glycidyl oligomer based on silicon-silicone (POSS) (example: CAS: 445379-56-6; CAS: 307496-38-4).

Figure 5:
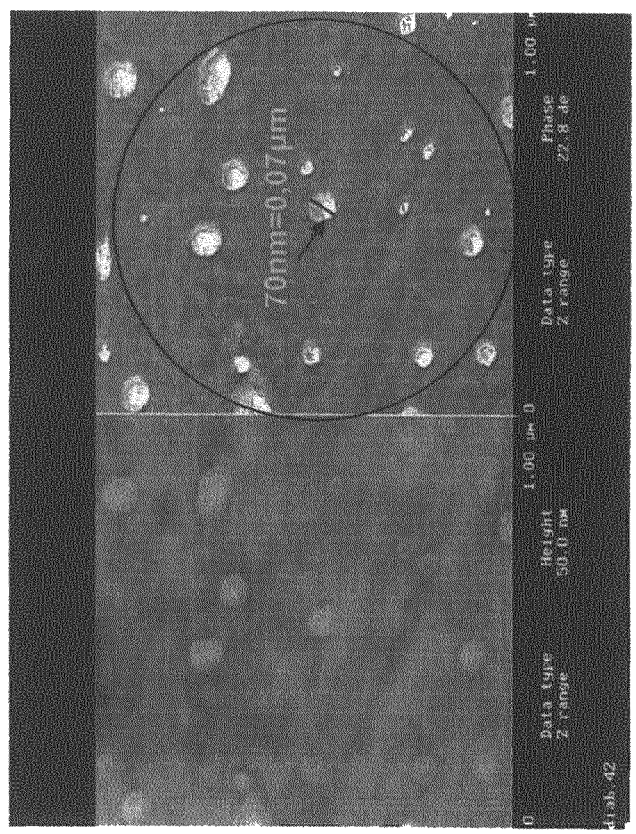
FIG. 5 represents an image obtained with an Atomic Force Microscope (AFM) of the nanodispersion of an epoxy homopolymer in the PET thermoplastic matrix.

In this step of the process of the invention, the epoxy resin undergoes a homopolymerization process, which develops inside the extruder (a so-called reactive extrusion). Furthermore, due to the use of epoxy resins in the liquid state (or previously not crosslinked), a nanodispersion of homopolymer particles can be obtained inside the continuous PET mass (see FIG. 5).

As a result of the presence of nanodispersed epoxy homopolymer in the PET mass, the latter is provided with the viscoelasticity necessary for the introduction of the blowing agent, to allow the subsequent foaming phase to take place.

The high catalytic activity of imidazole and its derivatives towards the homopolymerization reaction of the epoxy resin also allows this homopolymerization reaction to be completed within the above-mentioned step 3, therefore without involving the PET chains present in the reaction environment, thus leaving their chemical structure unaltered.

Figure 2:
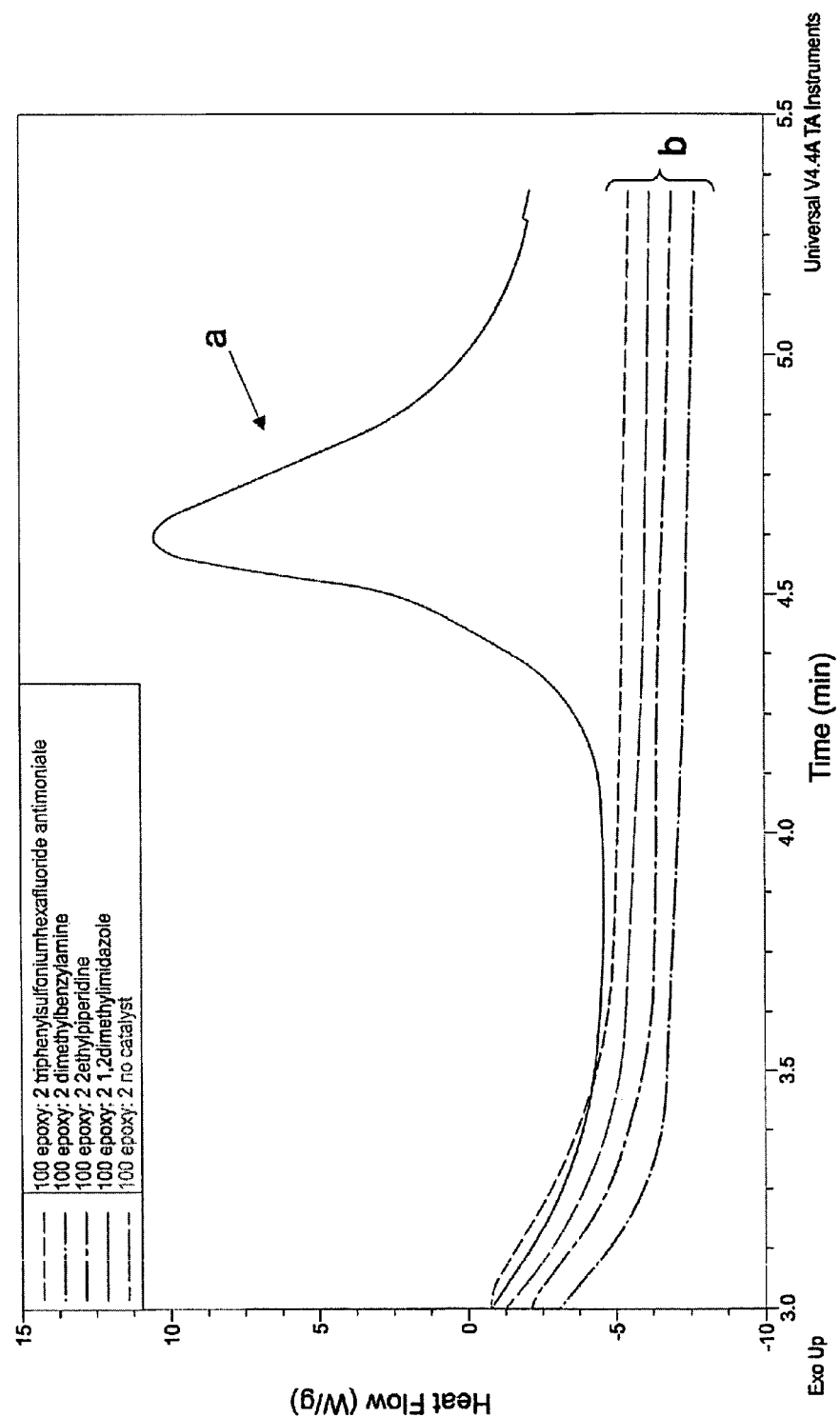
FIGS. 2 and 3 illustrate the exothermic homopolymerization reaction of the epoxy resin, when activated in the presence of imidazole and its derivatives, compared to those in which different catalysts or no catalyst is used.
Figure 3:
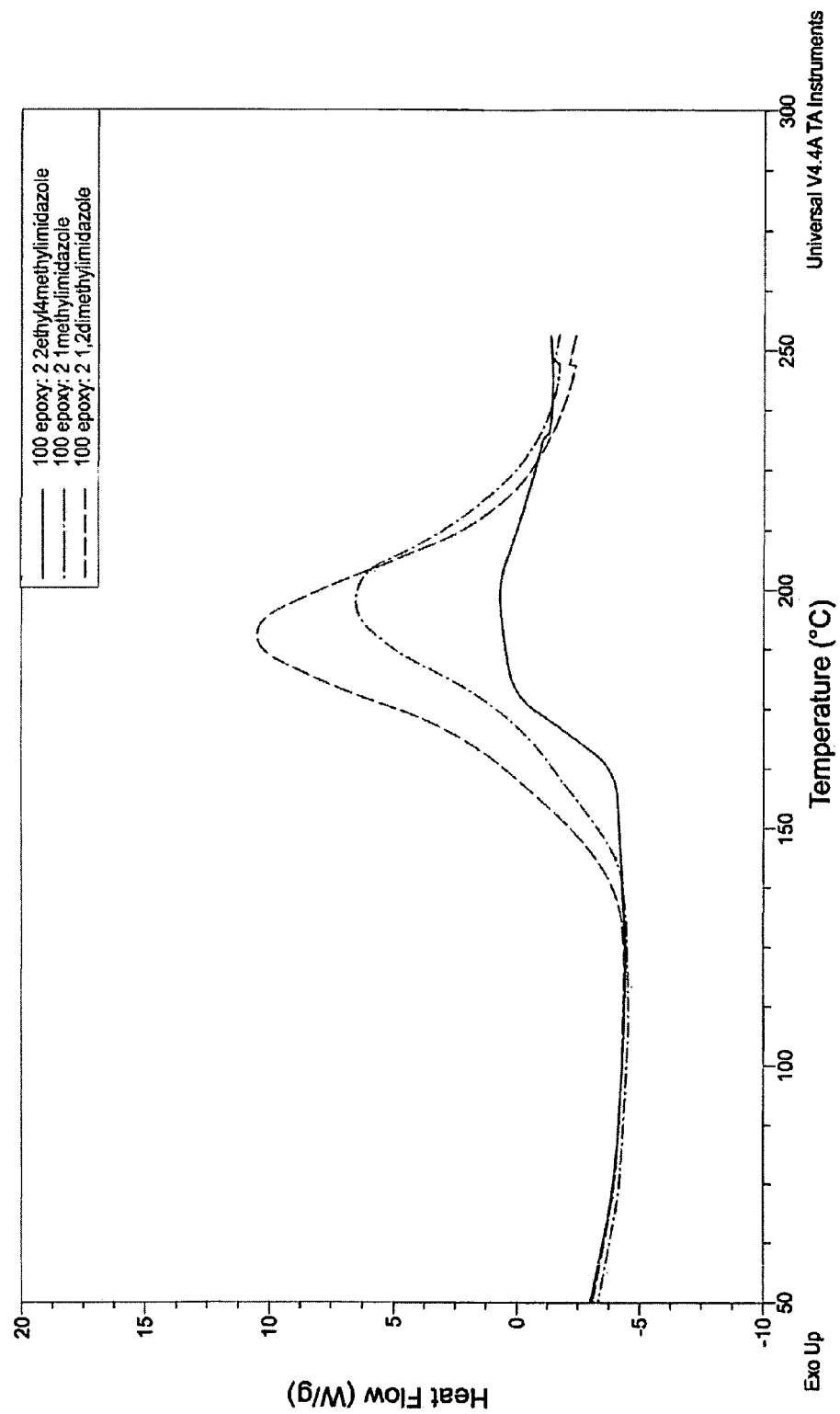
Figure 4:
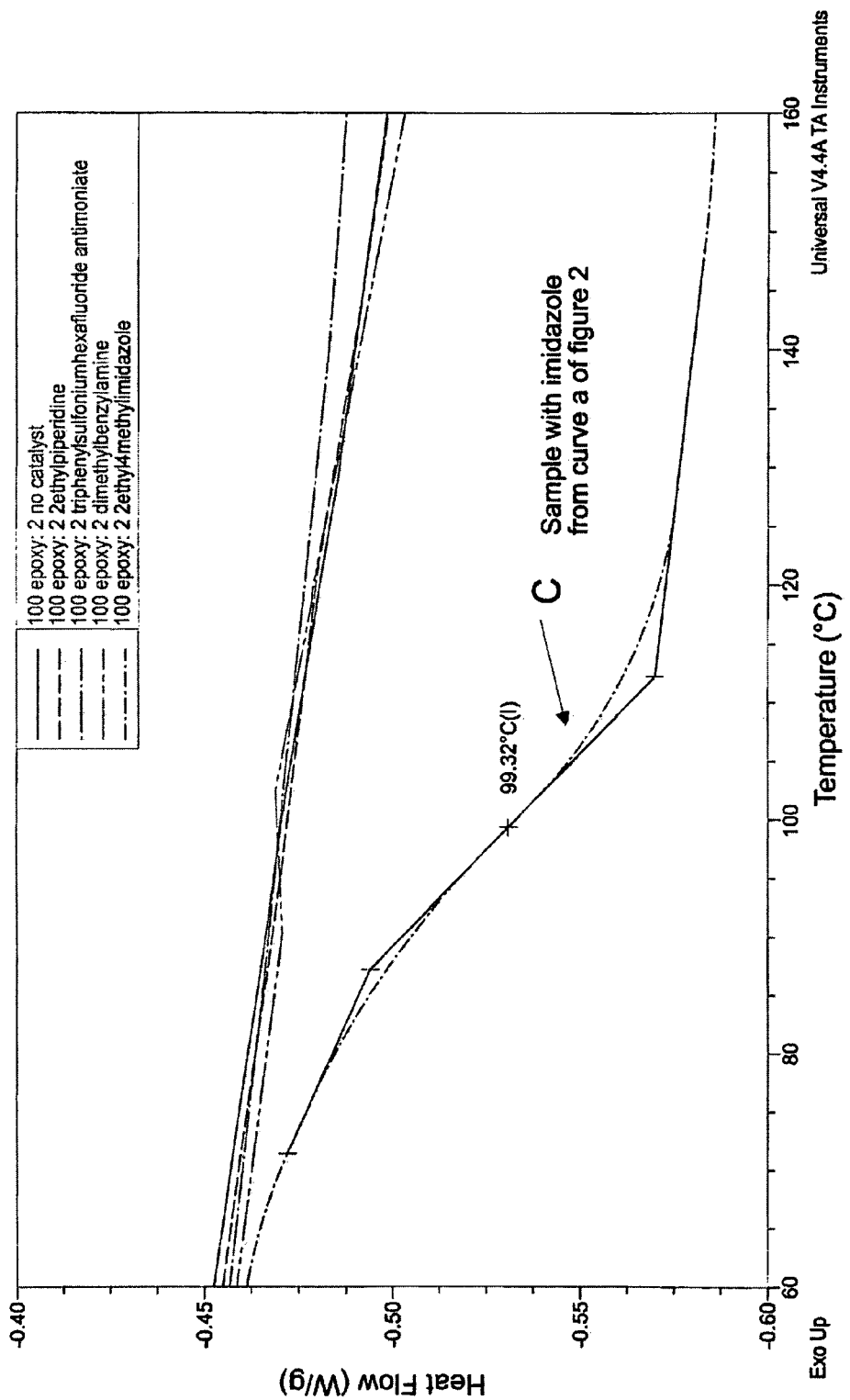
FIG. 4 illustrates the graph of a DSC (Differential Scanning calorimetry) analysis for evaluating the crosslinking of the epoxy resin, of the samples processed as in FIG. 2.

The elective behavior towards the epoxy resin of the catalyst used in the process of the invention, without involving the molecules of the PET polymer, is shown by the graphs in FIGS. 2 to 4. In particular, FIG. 2 compares the elective action of 1,2-dimethylimidazole having formula

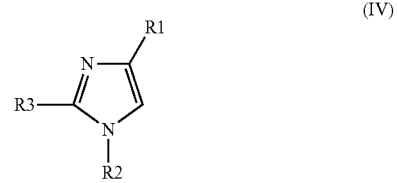

(IV)

wherein R1=H; R2=$CH_3$; R3=$CH_3$ with that offered by the catalysts of the known art, in particular triphenyl sulfonium hexafluoroantimonate, dimethylbenzylamine, 2-heptylpiperazine, or in the absence of catalyst.

From the graph of FIG. 2, which simulates upon DSC analysis, the operative conditions of the extrusion process of a mixture of epoxy resin alone (100 parts) with catalyst (2 parts), it can be observed that the catalyst according to the invention has an exothermic section (a) whose peak, compared with the flat trend of the corresponding sections (b) of the curves relating to the catalysts used according to the known art, or with the trend of the curve in the absence of catalyst, indicates the completion of the homopolymerization reaction of the epoxy phase, without involving the PET molecules, thus leaving them unaltered.

The same conclusions can be drawn from examining the exothermic sections represented in FIG. 3, this time relating to the family of imidazoles that can be used in the process of the invention.

FIG. 4 shows the DSC analysis of the samples tested as in FIG. 2, after simulation of the extrusion process. From the graph, it can be observed that the only sample that has undergone the homopolymerization reaction is that corresponding to the catalyst 2-ethyl-4-methylimidazole (curve c) of FIG. 4), which in fact has a glass transition temperature value (Tg) of 99.3° C. The flat trend of the remaining curves, relating to the samples of epoxy resin treated with catalysts different from that according to the process of the invention or samples without catalyst, indicates that the homopolymerization reaction has not taken place.

As a result of the formation of nanodispersed epoxy homopolymer, in step 3 of the extruder, within the PET mass, the latter is provided with a viscoelasticity sufficient for introducing 5 the blowing agent in step 6 of the extrusion, thus making it suitable for the subsequent foaming phase at the outlet 8 of the extruder. Said foaming phase is preceded by a cooling step 7 of the extruded product 9, the latter consisting of a continuous flow of expanded material, whose cooling process is completed at room temperature. End-products consisting of bodies of expanded material are subsequently obtained from this extruded product 9.

Some examples of formulations of the PET foam used in the process of the invention are provided hereunder, wherein the percentages refer to the weight of the mixture.

Extruder

Foaming process by extrusion obtained using a Leistritz ZSE40MAXX-44D extruder, as schematized in FIG. 1 and with the following temperature profile:

| SET ° C. | ZONE 1 | ZONE 3 | ZONE 6 | ZONE 7 | ZONE 8 |
|---|---|---|---|---|---|
| B | 295 | 280-260 | 255 | 255-230 | 260 |

EXAMPLE 1

Absence of Catalyst and Epoxy Resin

The following reagents were loaded into the extruder through the hopper 2:
PET: Polyclear 1011 of Invista (IV=0.83)
Talc dispersed in PET (1.3-3% with respect to PET) The blowing agent was added through the injection point (5):
Cyclohexane in liquid phase The pressure value (indication of the viscoelasticity of the mixture) inside the extruder is not such to keep the blowing agent in a homogeneously dispersed supercritical fluid phase. Attempts at foaming the PET therefore failed as the polymeric mass at the outlet of the extruder does not have a sufficient viscoelasticity for keeping the gas phase enclosed in cells.

EXAMPLE 2

Absence of Catalyst and Presence of Epoxy Resin

The following reagents were loaded into the extruder through the hopper 2:
PET: Polyclear 1011 of Invista (IV=0.83)
Talc dispersed in PET (1.3-3% with respect to PET) The following epoxy resin in liquid phase was added through the injection point (4):
Poly-epoxy: Lindoxy 290 (in liquid phase)
The blowing agent was added through the injection point (5):
Cyclohexane in liquid phase Also in this case, the pressure value (indication of the viscoelasticity of the mixture) inside the extruder is not such as to keep the blowing agent in a homogeneously dispersed supercritical fluid phase. Attempts at foaming the PET therefore failed as the polymeric mass with a low viscoelasticity at the outlet of the extruder is not capable of keeping the gas phase enclosed in cells.

EXAMPLE 3

Presence of Epoxy Resin and Catalyst-Dimethylbenzylamine

The following reagents were loaded into the extruder through the hopper 2:
PET: Polyclear 1011 of Invista (IV=0.83)
Talc dispersed in PET (1.3-3% with respect to PET)
Dimethylbenzylamine (in a percentage of up to 2.3% with respect to the epoxy resin)
The following epoxy resin in liquid phase was added through the injection point (4):
Poly-epoxy: Lindoxy 290 (in liquid phase) from 1.3 to 5%
The blowing agent was added through the injection point (5):
Cyclohexane in liquid phase Also in this case, the pressure value (indication of the viscoelasticity of the mixture) inside the extruder is not such to keep the blowing agent in a homogeneously dispersed supercritical fluid phase. Attempts at foaming the PET therefore failed as the polymeric mass with a low viscoelasticity at the outlet of the extruder is not capable of keeping the gas phase enclosed in cells.

EXAMPLE 4

Presence of Epoxy Resin and Catalyst-2-Ethylpiperidine

The following reagents were loaded into the extruder through the hopper 2:
PET: Polyclear 1011 of Invista (IV=0.83)
Talc dispersed in PET (1.3-3% with respect to PET)
2-ethylpiperidine (in a percentage of up to 2% with respect to the epoxy resin).
The following epoxy resin in liquid phase was added through the injection point (4):
Poly-epoxy: Lindoxy 290 (in liquid phase) from 1.3 to 5%.
The blowing agent was added through the injection point (5):
Cyclohexane in liquid phase Also in this case, the pressure value (indication of the viscoelasticity of the mixture) inside the extruder is not such to keep the blowing agent in a homogeneously dispersed supercritical fluid phase. Attempts at foaming the PET therefore failed as the polymeric mass with a low viscoelasticity at the outlet of the extruder is not capable of keeping the gas phase enclosed in cells.

EXAMPLE 5

Presence of Epoxy Resin and Catalyst Based on Imidazole

The following reagents were loaded into the extruder through the hopper 2:
PET: Polyclear 1011 of Invista (IV=0.83) or CLEARTUF P76 by M&G (IV=0.74)
Talc dispersed in PET (1.3-3% with respect to PET)
Catalyst based on imidazole (tests respectively effected with 2-methylimidazole, 2-ethyl-4-methylimidazole and 1,2-dimethylimidazole, in percentages of up to 2% with respect to the epoxy resin).
The following epoxy resins in liquid phase were added through the injection point (4):
Poly-epoxy: Lindoxy 290 (in liquid phase, from 1.3 to 5% with respect to PET)
Mono- or di epoxy: 2-Ethylhexyl glycidyl ether or 1,6-hexanediol diglycidyl ether (from 0 to 0.5% with respect to PET)
The blowing agent was added through the injection point (5):
Cyclohexane in liquid phase The pressure value (indication of the viscoelasticity of the mixture) inside the extruder is such to keep the blowing agent in a homogeneously dispersed supercritical fluid phase. For the various percentages of epoxy resin and catalyst, suitably dosed, attempts at foaming the PET were therefore successful, as the polymeric mass at the outlet of the extruder was sufficiently viscoelastic to keep the gas phase inside closed cells having a reduced dimension (less than 0.7 mm), producing a stable foam having a density ranging from 60-140 Kg/m$^3$.

The invention claimed is:

1. A process for producing polyethylene terephthalate (PET) foams, comprising:
   extruding a mixture of PET, epoxy resin, a catalyst consisting of imidazole, derivatives of imidazole or mixtures thereof, and a blowing agent,
   wherein a homopolymerization reaction of the epoxy resin is performed in an extruder, upstream of introducing the blowing agent.

2. The process according to claim 1, wherein said catalyst consists of imidazole, derivatives of imidazole or mixtures thereof and has a formula:

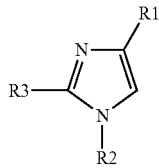

wherein R1, R2 and R3 are inorganic or organic groups of an aromatic or aliphatic type.

3. The process according to claim 1, wherein said catalyst is mixed with said PET in a melting and mixing step, said catalyst being in a liquid state.

4. The process according to claim 1, wherein said epoxy resin is in a liquid state and has the following formula:

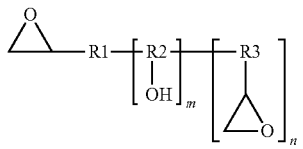

wherein:
   m and n are integers (0, 1, 2, 3, . . . ), and
   R1, R2 and R3 are organic, aliphatic or aromatic groups, or an inorganic chain.

5. The process according to claim 1, wherein the homopolymerization reaction provides for a reactive extrusion in a reaction environment.

6. The process according to claim 5, wherein epoxy homopolymer particles produced from the homopolymerization reaction are nanodispersed inside a continuous PET mass, a chemical structure of PET chains in the reaction environment being kept unaltered.

7. The process according to claim 6, further comprising a step of introducing the blowing agent into said continuous PET mass having the epoxy homopolymer particles nanodispersed therein, a step of cooling, and a step of foaming.

8. The process according to claim 1, wherein said mixture also includes, alone or combined with each other:
   plasticizers,
   pigments,
   flame-retardants,
   fillers,
   stabilizers,
   surfactants,
   nucleating agents, or
   nano-additives.

* * * * *